United States Patent
Seung et al.

(10) Patent No.: US 9,130,230 B2
(45) Date of Patent: Sep. 8, 2015

(54) NEGATIVE ELECTRODE ACTIVE MATERIAL WITH IMPROVED SAFETY, AND SECONDARY BATTERY COMPRISING SAME

(75) Inventors: Do Young Seung, Daejeon (KR); Sang Ick Lee, Daejeon (KR); Tae Hyun Jeon, Daejeon (KR); Ki Joo Hong, Daejeon (KR); Ung Ju Lee, Daejeon (KR); Dong Shin Kim, Daejeon (KR)

(73) Assignee: GS CALTEX CORPORATION, Seoul (KR)

( * ) Notice: Subject to any disclaimer, the term of this patent is extended or adjusted under 35 U.S.C. 154(b) by 0 days.

(21) Appl. No.: 13/806,008

(22) PCT Filed: Jun. 21, 2011

(86) PCT No.: PCT/KR2011/004511
§ 371 (c)(1),
(2), (4) Date: Dec. 20, 2012

(87) PCT Pub. No.: WO2011/162529
PCT Pub. Date: Dec. 29, 2011

(65) Prior Publication Data
US 2013/0089782 A1    Apr. 11, 2013

(30) Foreign Application Priority Data
Jun. 21, 2010  (KR) .................. 10-2010-0058621

(51) Int. Cl.
*H01M 4/133* (2010.01)
*H01M 4/587* (2010.01)
(Continued)

(52) U.S. Cl.
CPC .............. *H01M 4/587* (2013.01); *C01B 31/04* (2013.01); *H01M 4/38* (2013.01); *H01M 4/583* (2013.01);
(Continued)

(58) Field of Classification Search
CPC . H01M 4/133; H01M 2004/027; H01M 4/02; H01M 4/1393
USPC ........................................ 429/211
See application file for complete search history.

(56) References Cited

U.S. PATENT DOCUMENTS

2002/0012845 A1    1/2002 Choi et al.
2002/0015888 A1*   2/2002 Omaru et al. .............. 429/231.8
(Continued)

FOREIGN PATENT DOCUMENTS

| CN | 1650449 A | 8/2005 |
| JP | 05074457 A | 3/1993 |

(Continued)

OTHER PUBLICATIONS

International Search Report mailed Feb. 16, 2012 for PCT/KR2011/004511.
(Continued)

*Primary Examiner* — Stewart Fraser
*Assistant Examiner* — Olatunji Godo
(74) *Attorney, Agent, or Firm* — Lowe Hauptman & Ham, LLP

(57) ABSTRACT

The present invention relates to a negative electrode active material for an electrode mixture, and to an electrochemical cell comprising the negative electrode active material, wherein the negative electrode active material comprises an amorphous carbonaceous material and a doping element, and exhibits, in the temperature range of 450° C. to 950° C., at least two peaks of derivative weight change calculated by thermogravimetric analysis, and exhibits a maximum heat peak output of 20 mW to 60 mW as measured by differential scanning calorimetry.

10 Claims, 1 Drawing Sheet

(51) Int. Cl.
*C01B 31/04* (2006.01)
*H01M 10/0525* (2010.01)
*H01M 4/38* (2006.01)
*H01M 4/583* (2010.01)
*H01M 4/485* (2010.01)
*H01M 4/505* (2010.01)
*H01M 4/525* (2010.01)
*H01M 10/0566* (2010.01)

(52) U.S. Cl.
CPC .......... *H01M 10/0525* (2013.01); *H01M 4/485* (2013.01); *H01M 4/505* (2013.01); *H01M 4/525* (2013.01); *H01M 10/0566* (2013.01); *Y02E 60/122* (2013.01); *Y02T 10/7011* (2013.01)

(56) References Cited

U.S. PATENT DOCUMENTS

2004/0115117 A1* 6/2004 Takei et al. .................. 423/448
2004/0214087 A1  10/2004 Sheem et al.
2004/0229041 A1* 11/2004 Zou et al. ..................... 428/408
2006/0166098 A1*  7/2006 Tabuchi et al. ............... 429/232
2009/0181311 A1   7/2009 Iwanaga et al.
2009/0297953 A1  12/2009 Shimizu et al.

FOREIGN PATENT DOCUMENTS

| JP | 2001-229914 | 8/2001 |
| JP | 2001-332263 | 11/2001 |
| JP | 2006-306666 | 11/2006 |
| KR | 10-2008-0042858 | 5/2008 |
| KR | 10-2009-0017535 | 2/2009 |

OTHER PUBLICATIONS

Hiroyuki Fujimoto et al; "Properties of graphite prepared from boron-doped pitch as an anode for a rechargeable Li ion battery"; R&D Department, Osaka Gas Co. Ltd., 6-19-9 Torishima, Konohana-ku, Osaka 554-0051, Japan; Carbon 40 (2002) 567-574.
M. Endo et al; An Abstract of "Anode performance of a Li ion battery based on graphitized and B-doped milled mesophase pitch-based carbon fibers" (1page); Carbon vol. 37, Issued 4, Mar. 8, 1999.
Chinese Office Action dated Aug. 4, 2014.
Extended European Search Report dated Jun. 24, 2014.

* cited by examiner

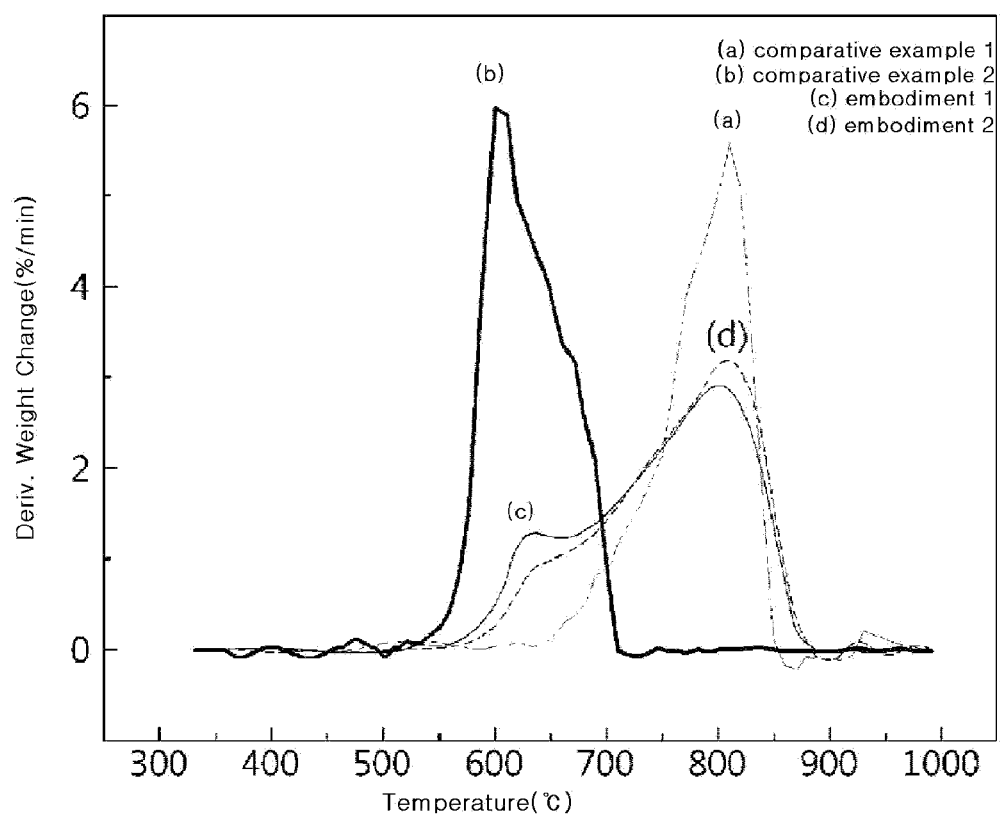

NEGATIVE ELECTRODE ACTIVE MATERIAL WITH IMPROVED SAFETY, AND SECONDARY BATTERY COMPRISING SAME

CROSS REFERENCE TO RELATED APPLICATION

This application claims the priority of Korean Patent Application No. 10-2010-0058621, filed on Jun. 21, 2010 in the KIPO (Korean Intellectual Property Office). Further, this application is the National Phase application of International Application No. PCT/KR2011/004511 filed Jun. 21, 2011, which designates the United States and was published in Korean.

TECHNICAL FIELD

The present invention relates to an negative electrode active material having improved safety and a secondary battery including the same. More particularly, the present invention relates to an negative electrode active material that has excellent safety under conditions of overcharge, high temperature, and the like, a secondary battery including the same, and a method of manufacturing the negative electrode active material.

BACKGROUND ART

Recent development of portable electronic devices such as mobile phones, notebook computers, and the like lead to rapid growth of demand for secondary batteries to be employed as power sources thereof. Furthermore, to reduce problems caused by global warming and depletion of fossil fuels, hybrid electric vehicles (HEV) and electric motor-driven electric vehicles (EV) have been developed and secondary batteries are increasingly adopted as power sources thereof. Accordingly, various studies have been conducted to provide secondary batteries capable of satisfying various requirements. Particularly, demand for lithium secondary batteries having high energy density, high discharge voltage and output is increasing.

In order to be applied to electric vehicles and the like, a lithium secondary battery needs to have high energy density and to provide high output in a short period of time while ensuring operation over 10 years or more under severe rapid charge and discharge conditions. Thus, it is necessary for such a lithium secondary battery to ensure superior output and longer lifespan than existing small-sized lithium secondary batteries. Further, since the lithium secondary battery for electric vehicles can undergo rapid exothermic reaction, it is necessary to prevent rapid exothermic reaction from occurring therein to secure safety.

A lithium secondary battery generally has a structure wherein a non-aqueous electrolyte containing a lithium salt is enclosed in an electrode assembly of a positive electrode and an negative electrode each having an active material coated on a current collector, with a porous separator interposed between the positive electrode and the negative electrode. The positive electrode active material is generally composed of lithium cobalt oxides, lithium manganese oxides, lithium nickel oxides, lithium composite oxides, and the like, and the negative electrode active material is generally composed of carbonaceous materials.

Carbonaceous materials are generally classified into graphitizable carbon (soft carbon) that has a graphene structure, non-graphitizable carbon (hard carbon), and graphite which has a complete graphene structure.

In particular, considering a theoretical maximum capacity of 372 mAh/g, an negative electrode composed of a graphite material of the graphene structure predominantly used as an negative electrode active material has a limit in capacity increase and thus is not ideal as a power source for future mobile devices.

On the other hand, although lithium has been suggested as an negative electrode material of the secondary battery, lithium has a problem of low reversibility. When lithium ions of the electrolyte are deposited onto the lithium metal of the negative electrode in a charging process, only a portion of the deposited lithium ions are dissolved into the electrolyte in a discharging process. That is, since only a portion of the lithium ions deposited onto the ions during the charging process can be reused during the discharging process, a relatively large amount of lithium is needed in order to prevent capacity deterioration. Further, the lithium ions are deposited in a dendrite or needle structure on the surface of the lithium material. Here, the dendrite lithium crystals can penetrate the separator to come into contact with the positive electrode, causing internal short circuit. Such short circuit can trigger exothermic breakdown, causing explosion of the battery.

DISCLOSURE

Technical Problem

An aspect of the present invention is to provide an negative electrode active material for an electrode mixture, which ensures excellent safety for electrochemical cells such as secondary batteries, includes an amorphous carbonaceous material and a doping element, and exhibits at least two peaks of derivative weight change at temperatures between 450° C. and 950° C. in thermogravimetric analysis, and a maximum exothermic peak output of 20 mW to 60 mW as measured by differential scanning calorimetry.

Technical Solution

In accordance with an aspect of the present invention, there is provided an negative electrode active material, which includes an amorphous carbonaceous material and a doping element, and exhibits at least two peaks of derivative weight change at temperatures of 450° C. to 950° C. in thermogravimetric analysis and a maximum exothermic peak output of 20 mW to 60 mW as measured by differential scanning calorimetry.

In accordance with another aspect of the present invention, there is provided a negative electrode mix, which includes the negative electrode active material, a binder, and a conductive material.

In accordance with a further aspect of the present invention, there is provided an electrochemical cell, which includes a negative electrode including a current collector coated with the negative electrode mixture.

In accordance with yet another aspect of the present invention, there is provided a method of manufacturing a negative electrode active material for an electrode mixture, which includes: uniformly mixing a doping element with at least one raw precursor selected from the group consisting of petroleum coke, coal coke, coal tar pitch, petroleum pitch, mesophase pitch, mesocarbon microbeads, and vinyl chloride resins in a solvent; drying, burning and carburizing the mixture; and grinding the carburized mixture.

Advantageous Effects

Embodiments of the present invention provide a negative electrode active material for an electrode mixture, which may prevent internal short circuit and explosion of an electrochemical cell such as secondary batteries by adjusting the quantity of heat generated in the electrochemical cell upon overcharge of the electrochemical cell or in use of the electrochemical cell at high temperature. Other embodiments of the present invention provide an electrochemical cell including the same.

DESCRIPTION OF DRAWINGS

FIG. 1 is a graph depicting derivative weight change depending on temperature in thermogravimetric analysis of negative electrode active materials according to the present invention and negative electrode active materials in the art.

BEST MODE

Next, embodiments of the present invention will be described in more detail.

According to one embodiment of the present invention, an negative electrode active material for an electrode mixture includes an amorphous carbonaceous material and a doping element, and exhibits at least two peaks of derivative weight reduction at temperatures between 450° C. and 950° C. in thermogravimetric analysis, and a maximum exothermic peak output of 20 mW to 60 mW as measured by differential scanning calorimetry.

Generally, the weight reduction caused by decomposition by oxidation of the amorphous carbonaceous material is exhibited by one peak in a graph depicting derivative weight change according to time (Δweight (%)/min). Such a peak is exhibited near about 800° C. for a carbonaceous material having high crystallinity and near about 500° C. for a carbonaceous material having low crystallinity.

However, the negative electrode active material according to the present invention disperses heat generation in the electrochemical cell based on properties of providing at least two peaks of derivative weight change at temperatures between 450° C. and 950° C. in thermogravimetric analysis, thereby preventing internal short circuit and explosion caused by rapid heat generation in the electrochemical cell.

Specifically, the negative electrode active material exhibits the first peak of derivative weight change at temperatures between about 500° C. and about 600° C. and the second peak of derivative weight change at temperatures between about 750° C. and about 900° C., thereby dispersing heat generation inside the electrochemical cell.

In addition, dispersion of heat generation inside the electrochemical cell by the negative electrode active material according to the present invention results in a maximum exothermic peak output between 20 mW to 60 mW as measured by differential scanning calorimetry, whereby the internal temperature of the electrochemical cell does not increase to a temperature causing internal short circuit or explosion, thereby ensuring safety of the electrochemical cell.

Meanwhile, even in the case where the negative electrode active material has at least two peaks of derivative weight change in thermogravimetric analysis and provides a maximum exothermic peak output between 20 mW to 60 mW as measured by differential scanning calorimetry, a total exothermic heat capacity of 10 kJ/g inside the electrochemical cell can cause generation of gas inside the electrochemical cell, internal short circuit, explosion, and the like. Thus, the negative electrode active material preferably has a total exothermic heat capacity ranging from 0.1 kJ/g to 10 kJ/g as measured by differential scanning calorimetry.

The negative electrode active material includes an amorphous carbonaceous material, which has rapid charge rate and excellent cycle characteristics.

The amorphous carbonaceous material may be any one selected from a graphitizable carbon material (soft carbon) and a non-graphitizable carbon material (hard carbon), preferably a graphitizable carbon material. The graphitizable carbon material may be prepared by heat treating a raw precursor in air or an inert gas atmosphere at a predetermined temperature to partially graphitize the raw precursor. In this process, grinding and/or de-agglomeration may be additionally performed. In one example, the negative electrode active material may be prepared by grinding the raw precursor into powder and heating the ground raw precursor to 500° C. to 2500° C.

The grinding and/or de-agglomeration of the raw precursor may be performed using a milling machine such as a ball mill, an attrition mill, a vibration mill, a disc mill, a jet mill, a rotor mill, and the like. Milling may include dry milling, wet milling, or a combination thereof. The average particle diameter and size distribution may be adjusted according to grinding speed, pressure, time, and the like in the process of grinding and/or de-agglomerating the raw precursor. Thus, the average particle diameter and the particle size distribution of the negative electrode active material may be determined in the process of grinding and/or de-agglomeration.

Graphitizable carbon material has a partly hexagonal regular arrangement (hexagonal network structure) after graphitization of the raw precursor.

Examples of the raw precursor for the graphitizable carbon material include petroleum coke, coal coke, coal tar pitch, petroleum pitch, mesophase pitch, mesocarbon microbeads, vinyl chloride resins, and the like, without being limited thereto. These raw precursors may be used alone or in combinations of two or more thereof.

As the doping element, any element may be used so long as the element does not cause chemical changes of the electrochemical cell while changing the properties of the negative electrode active material such that the negative electrode active material exhibits at least two peaks of derivative weight change at temperatures between 450° C. and 950° C. in thermogravimetric analysis and a maximum exothermic peak output in the range of 20 mW to 60 mW as measured by differential scanning calorimetry. For example, the doping element may be at least one selected from the group consisting of transition metal compounds including manganese (Mn), iron (Fe), cobalt (Co), nickel (Ni), and zinc (Zn); groups III, IV and V compounds including boron (B), aluminum (Al), gallium (Ga), indium (In), nitrogen (N), silicon (Si), phosphorus (P), and arsenic (As); and alkali metal or alkali earth-metal compounds including sodium (Na), potassium (K), magnesium (Mg), and calcium (Ca).

The transition metal compound including nickel (Ni) may include at least one selected from the group consisting of nickel nitrate, nickel sulfate, nickel acetate, and the like; the compound including boron (B) may include at least one selected from borate, boric acid, boron oxide, boron sulfide, boron nitride, boron chloride, and the like; the compound including phosphorus (P) may include at least one selected from the group consisting of hydrogen phosphide, phosphorous pentoxide, phosphoric acid, superphosphate, iodic acid, and the like.

The amount of the doping element may be suitably adjusted so as to improve electrical conductivity and high temperature safety in consideration of the kind of negative electrode active material. Preferably, the doping element is present in an amount of 0.1 wt % to 20 wt % based on the total weight of the negative electrode active material. An insufficient amount of the doping element makes it difficult to obtain desired effects by addition of the doping element, and an excessively large amount of the doping element can cause undesirable deterioration in characteristics of the battery due to increase in ratio of the doping element in the negative electrode active material.

In accordance with one embodiment, the present invention provides a negative electrode mix that includes the negative electrode active material, a binder, and a conductive material.

The binder is a component which assists in coupling between the negative electrode active material and the conductive material and in coupling the same to a current collector. Typically, the binder is present in an amount of 1 wt % to 50 wt % based on the total weight of the mixture including a positive electrode active material. Examples of the binder may include polyvinylidene fluoride, polyvinyl alcohol, carboxymethylcellulose (CMC), starch, hydroxypropyl cellulose, recycled cellulose, polyvinyl pyrrolidone, tetrafluoroethylene, polyethylene, polypropylene, ethylene-propylene-diene polymer (EPDM), sulfonated EPDM, styrene butadiene rubber, fluoro rubber, various copolymers, and the like.

As the conductive material, any material having electrical conductivity may be used so long as the material does not cause chemical changes of the battery. Examples of the conductive material may include conductive fibers such as metal fibers, or carbonaceous materials, such as carbon black, acetylene black, thermal black, channel black, furnace black, graphite, and the like; carbon fluoride, metal powder such as aluminum powder, nickel powder, and the like; conductive whiskers such as zinc oxide, titanate potassium, and the like; conductive metal oxides such as titanium oxide and the like; other conductive materials such as polyphenylene derivatives, and the like, without being limited thereto.

Optionally, the negative electrode mixture may further include a filler, an adhesion enhancer, and the like.

The filler is an assistant component for suppressing expansion of the electrode and any fibrous material may be used as the filler without limitation so long as the material does not cause chemical changes of the battery. Examples of the filler may include fibrous olefin polymers such as fibrous polyethylene, fibrous polypropylene, etc.; and other fibrous materials such as glass fiber, carbon fiber, and the like.

The adhesion enhancer is an assistant component for enhancing adhesion of the active material to the current collector and may be present in an amount of 10 wt % or less based on the weight of the binder. Examples of the adhesion accelerator may include oxalic acid, adipic acid, formic acid, acrylic acid derivatives, itaconic acid derivatives, and the like.

Further, a negative electrode may be fabricated, for example, by depositing the negative electrode mixture on the current collector. Specifically, a sheet electrode may be fabricated by adding the negative electrode mix to a predetermined solvent to prepare a slurry and depositing the slurry on a current collector such as a metal foil, followed by drying and pressing the slurry on the metal foil.

According to one embodiment of the present invention, an electrochemical cell includes the negative electrode in which the negative electrode mixture is deposited on the current collector.

Generally, the negative electrode is fabricated by adding the negative electrode mixture to a solvent such as N-methylpyrrolidone (NMP) to prepare a slurry and depositing the slurry on the current collector, followed by drying and pressing the slurry on the current collector. Examples of the solvent used in preparation of the slurry may include dimethyl sulfoxide (DMSO), alcohol, NMP, sodium carboxymethylcellulose (sodium CMC), acetone, and the like. Such a solvent may be present up to an amount of 400 wt % based on the total amount of the negative electrode mixture and is removed by drying.

The negative electrode current collector is generally formed to have a thickness of 3~500 µm. The negative electrode current collector may include any material which does not cause chemical changes of the battery and has high conductivity. Examples of materials for the negative electrode current collector may include copper, stainless steel, aluminum, nickel, titanium, sintered carbon, copper or stainless steel having a carbon, nickel, titanium or silver-coated surface, aluminum-cadmium alloys, and the like. Further, as in a positive electrode current collector, the negative electrode active material may be formed with fine undulations on the surface thereof to improve adhesion to the negative electrode active material and may have various shapes including film, sheet, foil, net, porous structures, foams, non-woven fabrics, or the like.

Uniform deposition of the paste for the negative electrode mixture on the negative electrode current collector may be performed by any method known in the art or by a suitable novel process in consideration of characteristics of materials to be deposited thereon. For example, the paste is distributed on the current collector and is uniformly dispersed thereon using a doctor blade or similar device. In some embodiments, dispersion and distribution of the paste may be performed by a single process. In addition, die-casting, comma coating, screen printing, and the like may be adopted for dispersion and distribution of the paste. Alternatively, the paste may be formed into a certain shape on a separate matrix and then bonded to the current collector by pressing or lamination. The paste deposited on the current collector may be dried in a vacuum oven at 50° C. to 200° C. for 12 to 72 hours.

The electrochemical cell is a device for supplying electricity through electrochemical reaction, and preferably a lithium secondary battery which includes a non-aqueous electrolyte containing a lithium salt. The lithium secondary battery may be manufactured to have a structure wherein the non-aqueous electrolyte containing a lithium salt is enclosed in an electrode assembly, in which a separator is interposed between a negative electrode and a positive electrode.

Other components of the lithium secondary battery according to the present invention will be described in detail below.

The positive electrode may be fabricated, for example, by depositing a mixture of a positive electrode active material, a conductive material and a binder on a positive electrode current collector, followed by drying the mixture thereon. As needed, fillers may be further added to the mixture.

The positive electrode current collector is generally formed to have a thickness of 3~500 µm. The positive electrode current collector may include any material which does not cause chemical changes of the battery and has high conductivity. Examples of materials for the positive electrode current collector may include stainless steel, aluminum, nickel, titanium, sintered carbon, aluminum or stainless steel having a carbon, nickel, titanium or silver-coated surface, and the like. Further, the positive electrode active material may be formed with fine undulations on the surface thereof to improve adhesion to the positive electrode active material and may have various shapes including film, sheet, foil, net, porous structures, foams, non-woven fabrics, or the like.

The positive electrode active material may be selected from among layered compounds such as lithium cobalt oxide ($LiCoO_2$) and lithium nickel oxide ($LiNiO_2$), or compounds substituted with one or more transition metals; lithium manganese oxides, such as compounds represented by $Li_{1+y}Mn_{2-y}O_4$ (where y ranges from 0 to 0.33), $LiMnO_3$, $LiMn_2O_3$, and $LiMnO_2$; lithium copper oxide ($Li_2CuO_2$); vanadium oxides such as $LiV_3O_8$, $LiFe_3O_4$, $V_2O_5$, and $Cu_2V_2O_7$; Ni-site type lithium nickel oxides represented by $LiNi_{1-y}M_yO_2$ (where M=Co, Mn, Al, Cu, Fe, Mg, B or Ga, and y ranges from 0.01 to 0.3); lithium manganese composite oxides represented by $LiMn_{2-y}M_yO_2$ (where M is Co, Ni, Fe, Cr, Zn or Ta and y ranges from 0.01 to 0.1) or $Li_2Mn_3MO_8$ (where M is Fe, Co, Ni, Cu or Zn); $LiMn_2O_4$, some Li of which is substituted with alkali earth metal ions; disulfide compounds; $Fe_2(MoO_4)_3$, and the like, without being limited thereto.

The separator is interposed between the positive electrode and the negative electrode and may be formed of an insulating thin film having high ion permeability and mechanical strength. The separator generally has a pore diameter of 0.01~10 μm and a thickness of 5~300 μm. As the separator, sheets or non-woven fabrics formed of, for example, olefin polymers such as polypropylene, glass fiber or polyethylene, which have chemical resistance and hydrophobicity, may be used. When a solid electrolyte such as a polymer is employed as the electrolyte, the solid electrolyte may act as both the separator and the electrolyte.

The non-aqueous electrolyte containing a lithium salt is composed of an electrolyte and the lithium salt. Examples of the electrolyte may include a non-aqueous organic electrolyte, organic solid electrolyte, inorganic solid electrolyte, and the like.

Examples of the non-aqueous organic electrolyte may include non-protic organic solvents, such as N-methyl-2-pyrollidone, propylene carbonate, ethylene carbonate, butylene carbonate, dimethyl carbonate, diethyl carbonate, γ-butyrolactone, 1,2-dimethoxyethane, tetrahydrofuran, 2-methyltetrahydrofuran, dimethylsulfoxide, 1,3-dioxolane, formamide, dimethylformamide, dioxolane, acetonitrile, nitromethane, methyl formate, methyl acetate, tri-ester phosphate, trimethoxymethane, dioxolane derivatives, sulfolane, methyl sulfolane, 1,3-dimethyl-2-imidazolidone, propylene carbonate derivatives, tetrahydrofuran derivatives, ether, methyl propionate, ethyl propionate, and the like.

Examples of the organic solid electrolyte may include polyethylene derivatives, polyethylene oxide derivatives, polypropylene oxide derivatives, phosphate ester polymers, poly-agitation lysine, polyester sulfide, polyvinyl alcohol, polyvinylidene fluoride, polymers containing ionic dissociation groups, and the like.

Examples of the inorganic solid electrolyte may include nitrides, halides, and sulfates of lithium, such as $Li_3N$, $LiI$, $Li_5NI_2$, $Li_3N$—$LiI$—$LiOH$, $LiSiO_4$, $LiSiO_4$—$LiI$—$LiOH$, $Li_2SiS_3$, $Li_4SiO_4$, $Li_4SiO_4$—$LiI$—$LiOH$, $Li_3PO_4$—$Li_2S$—$SiS_2$, and the like.

The lithium salt is a material that is readily soluble in such a non-aqueous electrolyte, and may include, for example, LiCl, LiBr, LiI, $LiClO_4$, $LiBF_4$, $LiB_{10}Cl_{10}$, $LiPF_6$, $LiCF_3SO_3$, $LiCF_3CO_2$, $LiAsF_6$, $LiSbF_6$, $LiAlCl_4$, $CH_3SO_3Li$, $CF_3SO_3Li$, $(CF_3SO_2)_2NLi$, chloroborane lithium, lower aliphatic carboxylic acid lithium, lithium tetraphenyl borate, and imides.

In addition, in order to improve charge/discharge characteristics and flame retardancy, for example, pyridine, triethylphosphite, triethanolamine, cyclic ether, ethylenediamine, n-glyme, hexaphosphoric triamide, nitrobenzene derivatives, sulfur, quinone imine dyes, N-substituted oxazolidinone, N,N-substituted imidazolidine, ethylene glycol dialkyl ether, ammonium salts, pyrrole, 2-methoxy ethanol, aluminum trichloride or the like may be added to the non-aqueous electrolyte. As needed, in order to impart incombustibility, the non-aqueous electrolyte may further include halogen-containing solvents such as carbon tetrachloride and ethylene trifluoride. Further, in order to improve high-temperature storage characteristics, the non-aqueous electrolyte may additionally include carbon dioxide gas.

In accordance with one embodiment of the invention, a method of preparing an negative electrode active material for an electrode mixture includes uniformly mixing a doping element with at least one raw precursor selected from the group consisting of petroleum coke, coal coke, coal tar pitch, petroleum pitch, mesophase pitch, mesocarbon microbeads and vinyl chloride resins in a solvent; and drying, burning and carburizing the mixture; and grinding the carburized mixture.

The burning and carburizing processes may be performed in a vacuum or an inert atmosphere, for example, in nitrogen or argon atmosphere, to prevent oxidation of the raw precursor.

The burning process may be performed at a carburization temperature of the precursor or more, for example, at a temperature of 600° C. to 2000° C., which may vary dependent on the kind of precursor to be used in manufacture of the negative electrode active material.

In operation of grinding, the carbide subjected to burning and carburization may be ground to an average particle size of 3 μm to 30 μm by the method of grinding an easily graphitizable carbon material as mentioned above.

If the ground carbide particles have too large a particle diameter, there is a problem of decrease in volume density of the negative electrode active material, and if the ground carbide particles have too small a particle diameter, there are problems such as increase in irreversible capacity of the negative electrode active material and difficulty in achieving desired discharge capacity.

Next, the present invention will be described in more detail with reference to some examples. However, these examples are provided for illustration only and should not be construed as limiting the scope or spirit of the present invention.

EXAMPLES

Example 1

As an amorphous carbonaceous material, petroleum coke was subjected to heat treatment at 500° C. or more and grinding to obtain an amorphous carbon precursor, and 6 wt % of phosphoric acid was added based on the total weight of the mixture to the amorphous carbon precursor, followed by mixing for 10 minutes. Then, the mixture was heat-treated at 800° C. or more for 10 hours or less, thereby preparing a carbonaceous active material.

Example 2

A carbonaceous active material was prepared in the same manner as in Example 1 except that 6 wt % of phosphorous pentoxide was added to the amorphous carbon precursor based on the total weight of the mixture.

Example 3

A carbonaceous active material was prepared in the same manner as in Example 1 except that 14 wt % of phosphoric acid and 47 wt % of distilled water were added to the amorphous carbon precursor, based on the total weight of the mixture, followed by mixing for 30 minutes.

Example 4

A carbonaceous active material was prepared in the same manner as in Example 1 except that 5.5 wt % of phosphoric acid was mixed with the amorphous carbon precursor, and the mixture was placed in a circular flask and held at 100° C. for 12 hours, followed by vacuum filtration and drying in an oven at 100° C. for 12 hours.

Comparative Example 1

A carbonaceous active material was prepared by graphitizing carbon fiber or granular carbon obtained from mesophase pitch through heat treatment at 2000° C. or more, followed by grinding and heat treatment at 2000° C. or more.

Comparative Example 2

As an amorphous carbonaceous material, petroleum coke was subjected to heat treatment at 500° C. or more and grinding to obtain an amorphous carbon precursor. The amorphous carbon precursor was heat-treated at 800° C. or more for 2 hours or less, thereby preparing a carbonaceous active material.

Experimental Example 1

Lithium secondary batteries according to examples and comparative examples were manufactured by a method known in the art except for the use of the carbonaceous active materials prepared in the examples and the comparative examples as negative electrode active materials. The heat capacity and the maximum exothermic peak output of each of the prepared lithium secondary batteries were measured. Results are shown in Table 1.

The total exothermic heat capacity of the active material by differential scanning calorimetry (DSC) was measured as follows. In DSC measurement with a Setsys 16/18 (Setaram Co., Ltd.), temperature was raised at a rate of 10° C./min from 25° C. to 1000° C. in air. Heat generation start/finish temperatures (° C.), maximum exothermic peak output (mW), and total exothermic heat capacity (kJ/g) were measured. Results are shown in Table 1.

With a thermogravimetric analyzer (TGA) Q500 (TA Instrument Inc.), derivative weight change according to time (Δweight (%)/min) was measured through thermogravimetric analysis at a temperature increasing rate of 10° C./min from 25° C. to 1000° C. in air. Results are shown in FIG. 1.

TABLE 1

| | Heat capacity (kJ/g) | Maximum exothermic peak output (mW) |
|---|---|---|
| Comparative Example 1 | 14.0 | 114.97 |
| Comparative Example 2 | 1.9 | 73.14 |
| Example 1 | 1.6 | 52.44 |
| Example 2 | 1.8 | 51.32 |
| Example 3 | 2.9 | 53.78 |
| Example 4 | 8.9 | 54.20 |

As can be seen from Table 1, in the secondary batteries including the negative electrode active materials prepared in the examples of the present invention, the heat capacity was maintained at 10 kJ/g or less and the maximum exothermic peak output did not exceed 60 mW. From these results, it can be seen that the secondary batteries including the negative electrode active materials prepared in the examples of the present invention exhibit improved safety.

As can be seen from FIG. 1, for the negative electrode active materials prepared in the examples of the present invention, the first peak of derivative weight change appeared at temperatures between 500° C. and 600° C., and the second peak of derivative weight change appeared at temperatures between about 750° C. to about 900° C. On the contrary, the carbonaceous material having high crystallinity in Comparative Example 1 exhibited the first peak near about 800° C. and the carbonaceous material having low crystallinity in Comparative Example 2 exhibited the first peak near about 500° C. From these results, it can be seen that the negative electrode active material according to the present invention disperses exothermic reaction to sequentially occur twice upon internal heat generation of the electrochemical cell, thereby reducing internal short circuit and explosion due to rapid heat generation inside the electrochemical cell.

Although some exemplary embodiments have been described with reference to the accompanying drawings, it will be understood by those skilled in the art that various modifications, changes, alterations, and equivalent embodiments can be made without departing from the spirit and scope of the invention.

Therefore, it should be appreciated that the foregoing embodiments are provided for illustrative purposes only and are not to be in any way construed as limiting the present invention. The scope of the present invention should be limited only by the accompanying claims and equivalents thereof.

The invention claimed is:

1. A negative electrode active material for an electrode mixture, the negative electrode active material comprising:
   an amorphous carbonaceous material, and
   a doping element,
   wherein the negative electrode active material exhibits at least two peaks of derivative weight change at temperatures between 450° C. to 950° C. in thermogravimetric analysis and a maximum exothermic peak output of 20 mW to 60 mW as measured by differential scanning calorimetry, and
   wherein the doping element includes phosphorus (P), and
   wherein the negative electrode active material has a total exothermic heat capacity of 0.1 kJ/g to 10 kJ/g, as measured by differential scanning calorimetry.

2. The negative electrode active material according to claim 1, wherein the peaks of derivative weight change comprise the first peak of derivative weight change at temperatures between 500° C. and 600° C. and the second peak of derivative weight change at temperatures between 750° C. and 900° C.

3. The negative electrode active material according to claim 1, wherein the amorphous carbonaceous material comprises one material selected from a graphitizable carbon material and a non-graphitizable carbon material.

4. The negative electrode active material according to claim 3, wherein a raw precursor for the graphitizable carbon material comprises at least one selected from the group consisting of petroleum coke, coal coke, coal tar pitch, petroleum pitch, mesophase pitch, mesocarbon microbeads, and vinyl chloride resins.

5. The negative electrode active material according to claim 1, wherein the doping element further comprises at least one selected from the group consisting of transition metal compounds including manganese (Mn), iron (Fe), cobalt (Co), nickel (Ni), and zinc (Zn); groups III, IV and V compounds including boron (B), aluminum (Al), gallium (Ga), indium (In), nitrogen (N), silicon (Si), and arsenic (As); and alkali metal or alkali earth-metal compounds including sodium (Na), potassium (K), magnesium (Mg), and calcium (Ca).

6. The negative electrode active material according to claim 1, wherein the doping element is present in an amount of 0.1 wt % to 20 wt % based on the total weight of the negative electrode active material.

7. A negative electrode mixture comprising the negative electrode active material according to claim 1, a binder, and a conductive material.

8. An electrochemical cell comprising a negative electrode in which the negative electrode mixture according to claim 7 is dispersed on a current collector.

9. The electrochemical cell according to claim 8, wherein the electrochemical cell is a lithium secondary battery comprising a non-aqueous electrolyte containing a lithium salt.

10. A negative electrode active material for an electrode mixture, the negative electrode active material comprising:
   an amorphous carbonaceous material, and
   a doping element,
   wherein the negative electrode active material exhibits at least two peaks of derivative weight change at temperatures between 450° C. to 950° C. in thermogravimetric analysis and a maximum exothermic peak output of 20 mW to 60 mW as measured by differential scanning calorimetry, and
   wherein the negative electrode active material is free of silicon, and
   wherein the negative electrode active material has a total exothermic heat capacity of 0.1 kJ/g to 10 kJ/g, as measured by differential scanning calorimetry.

* * * * *